(12) United States Patent
Hershkowitz et al.

(10) Patent No.: US 7,875,402 B2
(45) Date of Patent: *Jan. 25, 2011

(54) PROTON CONDUCTING SOLID OXIDE FUEL CELL SYSTEMS HAVING TEMPERATURE SWING REFORMING

(75) Inventors: Frank Hershkowitz, Liberty Corner, NJ (US); Paul J Berlowitz, Glen Gardner, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 975 days.

This patent is subject to a terminal disclaimer.

(21) Appl. No.: 11/353,783

(22) Filed: Feb. 14, 2006

(65) Prior Publication Data

US 2006/0188760 A1 Aug. 24, 2006

Related U.S. Application Data

(60) Provisional application No. 60/655,361, filed on Feb. 23, 2005.

(51) Int. Cl.
H01M 8/10 (2006.01)
H01M 8/24 (2006.01)
H01M 8/04 (2006.01)

(52) U.S. Cl. .................. 429/465; 429/479; 429/490; 429/512

(58) Field of Classification Search ............... 429/13, 429/465, 479, 490, 512
See application file for complete search history.

(56) References Cited

U.S. PATENT DOCUMENTS 4,240,805 A * 12/1980 Sederquist ............ 48/214 R
4,910,100 A * 3/1990 Nakanishi et al. ............ 429/32
5,208,114 A * 5/1993 Uematsu et al. ............ 429/415
6,576,203 B2 * 6/2003 Abe et al. .................. 422/191
6,787,576 B2 9/2004 Kiss et al.
7,045,553 B2 5/2006 Hershkowitz
7,053,128 B2 5/2006 Hershkowitz
7,217,303 B2 * 5/2007 Hershkowitz et al. ..... 48/197 R
7,491,250 B2 2/2009 Hershkowitz et al.
7,503,948 B2 3/2009 Hershkowitz et al.
2002/0048699 A1 * 4/2002 Steele et al. ................ 429/30
2003/0235529 A1 * 12/2003 Hershkowitz et al. ....... 423/652
2004/0191166 A1 9/2004 Hershkowitz et al.
2004/0241505 A1 * 12/2004 Hershkowitz et al. ......... 429/17
2005/0201929 A1 9/2005 Hershkowitz et al.
2006/0183009 A1 8/2006 Berlowitz et al.
2006/0188760 A1 8/2006 Hershkowitz et al.
2007/0059234 A1 3/2007 Agnihotri et al.
2007/0144940 A1 6/2007 Hershkowitz et al.
2008/0038598 A1 2/2008 Berlowitz et al.

* cited by examiner

*Primary Examiner*—Jennifer K Michener
*Assistant Examiner*—Eli S Mekhlin
(74) *Attorney, Agent, or Firm*—Paul E. Purwin

(57) ABSTRACT

The present invention provides an improvement in the process of producing energy from fuel cells. A cyclic reforming process, referred to as temperature swing reforming, provides an efficient means for producing a hydrogen containing synthesis gas for use in proton conducting solid oxide fuel cell applications. In one embodiment, at least some synthesis gas which is first produced in the temperature swing reforming process is combusted with air to provide the heat for the regeneration step of the temperature swing reforming process. The syngas produced in TSR is particularly well suited for use in proton conducting solid oxide fuel cell applications.

27 Claims, 2 Drawing Sheets

Figure 1(a) Reforming Step

Figure 1(b) Regeneration Step

PROTON CONDUCTING SOLID OXIDE FUEL CELL SYSTEMS HAVING TEMPERATURE SWING REFORMING

This application claims the benefit of U.S. Provisional Application No. 60/655,361 filed Feb. 23, 2005.

FIELD OF THE INVENTION

The present invention relates to process improvements in the production of hydrogen from hydrocarbon fuel and its use in fuel cells. More particularly, the invention relates to a process scheme wherein synthesis gas produced in a cyclic reforming process is integrated with and used in a solid oxide fuel cell ("SOFC"). The cyclic reforming process is herein referred to as "Temperature Swing Reforming" or "TSR" for short. In temperature swing reforming, the reforming step of the synthesis gas production is followed by a regeneration step. The hydrogen stream produced by TSR is particularly well suited for use in a SOFC being at temperatures conducive to efficient use by that type of fuel cell. In a preferred embodiment, TSR is integrated physically with the SOFC to increase the overall efficiency of the system. The present invention provides an efficient process for producing energy from a hydrocarbon fueled fuel cell system, particularly useful for confined space applications such as "on board" vehicle applications (e.g. passenger vehicles, trucks, buses or the like) and distributed power systems.

BACKGROUND OF THE INVENTION

Solid oxide fuel cells hold promise for a variety of power applications including distributed power generation and vehicular use. Present SOFC systems are capable of operating at substantially higher temperatures than polymer electrolyte or direct alcohol fuel cell systems, being able to withstand temperatures of as high at 1000° C. Moreover, SOFC are substantially more tolerant of "contaminant" gases that often accompany the hydrogen fuel, particularly when produced from a hydrocarbon source. The present invention integrates temperature swing reforming with a solid oxide fuel cell to provide an efficient power generation system that can be fueled with common hydrocarbon fuel.

Conventional synthesis gas generating processes include steam reforming, gas phase partial oxidation and autothermal reforming. Each of these processes has advantages and disadvantages when compared to each other.

In a steam reforming process, steam is reacted with a hydrocarbon containing feed to produce a hydrogen-rich synthesis gas. The general stoichiometry, as illustrated for methane, is:

$$CH_4 + H_2O \rightarrow CO + 3H_2 \quad (1)$$

Typically, an excess of steam is used to drive the equilibrium to the right. As applied to hydrogen manufacture, excess steam also serves to increase the water-gas shift reaction:

$$CO + H_2O \rightarrow CO_2 + H_2 \quad (2)$$

Because of the high endothermicity of the reaction, steam reforming is typically carried out in large furnaces, in which a reforming catalyst is packed into tubes. The tubes must withstand the high pressure of the produced synthesis gas, while transmitting heat at temperatures approaching 1000° C. As described in Stanford Research Institute International Report No. 212 (1994), steam reforming process efficiency, (defined as the heat of combustion of product hydrogen divided by the heat of combustion of reforming feed and furnace fuel), is approximately 74%, while the space velocity, (defined as Standard Cubic Feet per Hour of $C_1$-equivalent feed/ft$^3$ of catalyst bed) is about 1000 hr$^{-1}$. Unfortunately, steam reforming furnaces occupy a very large volume of space, substantially greater than the tube volume. This feature, and the relatively low efficiency, combine to severely limit its utility in point-of-use fuel applications such as fuel cells and would likely be unfeasible for on-board vehicle applications or distributed power applications.

Sederquist (U.S. Pat. Nos. 4,200,682, 4,240,805, 4,293,315, 4,642,272 and 4,816,353) all teach a steam reforming process in which the heat of reforming is provided within the bed by cycling between combustion and reforming stages of a cycle. As noted by Sederquist, high quality heat recovery within reforming bed can produce results in a theoretical efficiency of about 97%. However, these patents describe a process that operates at very low productivity, with space velocities of around 100 hr$^{-1}$. One consequence of Sederquist's low space velocity is that resulting high heat losses impede their ability to achieve high efficiency. The present invention solves this problem.

Oxygen ion conducting solid oxide fuel cells typically operate at temperatures ranging from about 650° C. to about 1000° C. These temperatures are required for the oxide ion to be sufficiently mobile in the electrolyte.

The inventors here have discovered a process for producing hydrogen from a hydrocarbon containing fuel integrated with a proton conducting solid oxide fuel cell that produces a highly efficient power generating system.

SUMMARY OF INVENTION

The present invention provides an improvement in the process of producing electricity from fuel cells where the fuel cell is fueled with a synthesis gas produced from a hydrocarbon feed. A cyclic reforming process, referred to as temperature swing reforming, provides an efficient means for producing a hydrogen enriched synthesis gas for fuel cell applications. Temperature swing reforming is integrated with a proton conducting solid oxide fuel cell to achieve superior thermal and material efficiencies relative to conventional fuel processor/fuel cell systems. In one embodiment the temperature swing reforming process is physically integrated with the SOFC. The integrated design results in high system efficiency. Specific embodiments are detailed hereinafter.

The process of temperature swing reforming, detailed hereinafter, is generally described as:

(a) introducing a feed stream comprising a hydrocarbon and steam at a space velocity greater than about 500 hr$^{-1}$ through a first end of a first zone containing bed packing materials and a steam reforming catalyst that are heated to a reforming temperature to produce a synthesis gas stream containing $H_2$, CO and $CO_2$.

(b) passing at least a portion of the product of step (a) to a second zone containing bed packing materials via the first end of 2nd zone, and transferring the heat from the synthesis gas stream to the packing materials;

(c) removing substantially all of the product from said second zone via the second end of 2nd zone;

(d) introducing an oxygen-containing gas into the second end of said second zone;

(e) contacting said oxygen-containing gas with a fuel and combusting said gas and fuel within said zones, thereby reheating said first zone to reforming temperatures and creating a fluegas which exits through the first end of said first zone.

The illustrative embodiments of the invention are set forth in the detailed description hereinafter.

DETAILED DESCRIPTION

The temperature swing reforming process efficiently produces a hydrogen containing synthesis gas that is used to fuel a proton conducting solid oxide fuel cell.

Solid-oxide fuel cells (SOFCs) are conventionally made from solid-state materials, with electrolytes generally comprising an ion conducting ceramic oxide. As in other fuel cells, SOFCs consist of three components: a cathode, an anode, and an electrolyte sandwiched between the two. The electrolyte in an SOFC is a solid which may conduct either oxygen or hydrogen ions. The current invention utilizes a proton conducting electrolyte which work on the basis of proton conduction rather than oxygen ion conduction. Protons are transported across the fuel cell membrane and combine with oxygen and electrons at the cathode to produce water. The cathode effluent, which contains product water, is used to meet steam needs of the TSR process. This reduces or eliminates the need to condense and collect liquid water. As compared to oxygen conducting cells, no direct oxidation reaction of CO or light hydrocarbons is performed at the anode. However, as protons are removed, an electrolyte and/or catalyst material present at the anode with water-gas shift activity, may be used to convert an amount of the CO present in a syngas mixture to CO2 and additional hydrogen as long as the stream contains water. The reaction will be driven by removal of hydrogen. The protons travel through the electrolyte to the cathode, where they react with oxygen that has been delivered to the cathode. Alternatively, the synthesis gas may undergo a separate water-gas shift reaction and/or separation process prior to its utilization at the fuel cell anode. The protons are reacted with oxygen at the cathode, producing water, while the electrons travel through an external circuit, thereby producing electricity. The electrons are used to complete the proton-oxygen reaction at the cathode, thus continuing the electricity-generating cycle. Individual cells can be stacked together in series to generate higher voltages as each cell typically produces from 0.5 to 1.2V. The simple reaction for a hydrogen fueled proton conducting fuel cell may be expressed as follows:

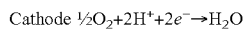
Cathode $\frac{1}{2}O_2 + 2H^+ + 2e^- \rightarrow H_2O$

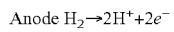
Anode $H_2 \rightarrow 2H^+ + 2e^-$

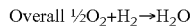
Overall $\frac{1}{2}O_2 + H_2 \rightarrow H_2O$

Figure 1:
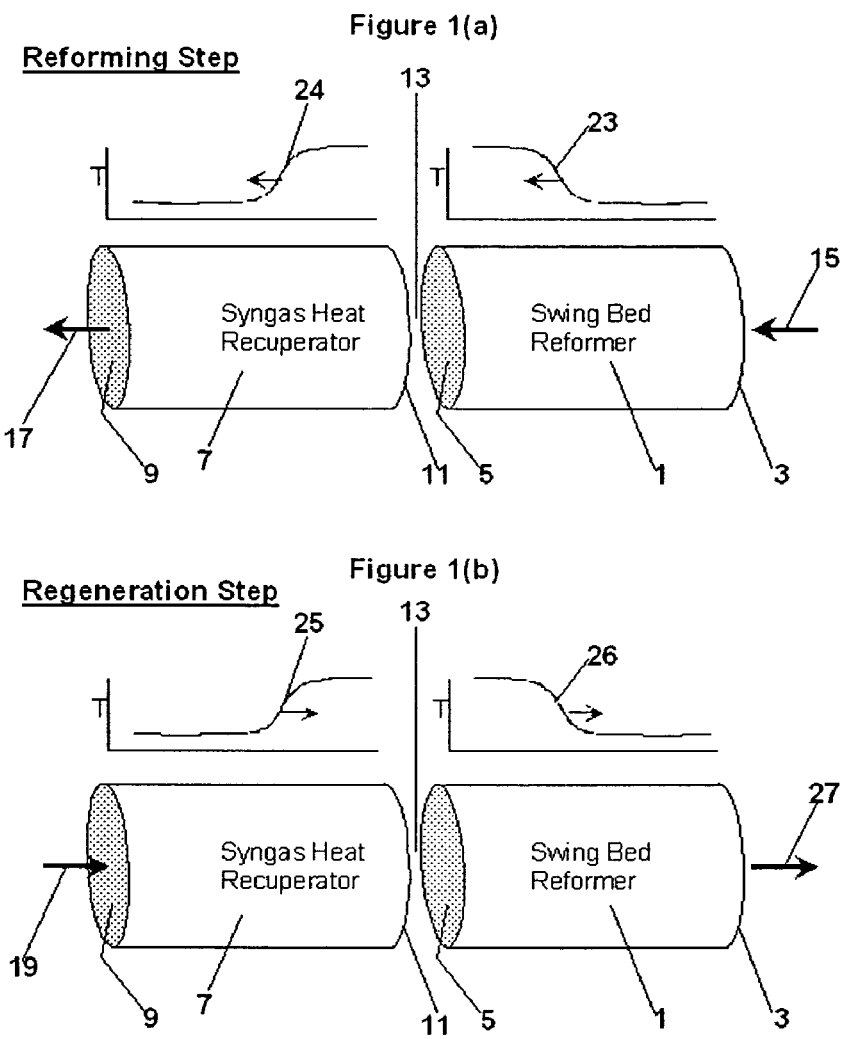
FIGS. 1a and 1b are diagrammatic illustrations of the reforming and regeneration steps of temperature swing reforming.

Cyclic Reforming—The basic two-step cycle of temperature swing reforming is depicted in FIG. 1. Referring now to FIGS. 1a and 1b, a first zone, or reforming zone (1), also called a swing bed reformer, and a second zone, or recuperating zone, also called a synthesis gas heat recuperator (7). The beds of both zones will include packing material, while the reforming zone (1) bed will include catalyst for steam reforming. Though illustrated as separate reforming and recuperating zones, it is to be recognized that the temperature swing reforming apparatus may comprise a single reactor, and further, that the apparatus may be physically integrated with the solid oxide fuel cell apparatus.

As shown in FIG. 1a, at the beginning of the first step of the cycle, also called the reforming step, the reforming zone (1) is at an elevated temperature ranging from about 800° to about 1600° C. and the recuperating zone (7) is at a lower temperature than the reforming zone (1). A hydrocarbon-containing feed is introduced via a conduit (15), into a first end (3) of the reforming zone (1) along with steam. The hydrocarbon may be any material that undergoes an endothermic steam reforming reaction including methane, petroleum gases, petroleum distillates, kerosene, jet fuel, fuel oil, heating oil, diesel fuel, gas oil and gasoline. Preferably the hydrocarbon will be a gaseous material or one which will rapidly become substantially gaseous upon introduction into the reforming zone (1). Alternatively, or in combination with the forgoing, the feed may comprise methanol, ethanol, DME, glycol, esters or ethers, or combinations thereof. Preferably, the steam will be present in proportion to the hydrocarbon in an amount that results in a steam to carbon ratio between about 1 and about 3 (considering only carbon in the hydrocarbon, not carbon in CO or $CO_2$ species that may be present).

This feed stream picks up heat from the bed and is converted over the catalyst and heat to synthesis gas. As this step proceeds, a temperature profile (23) is created based on the heat transfer properties of the system. This temperature profile typically comprises a gradient from the lower temperature of the reformer inlet that ranges from 100-800° C., preferably 300° C. to 700° C., to the reforming bed temperature that ranges from about 800° C. to about 1600° C. When the bed is designed with adequate heat transfer capability, as described herein, this profile has a relatively sharp temperature gradient, which gradient will move across the reforming zone (1) as the step proceeds.

Synthesis gas exits the reforming bed (1) through a second end (5) at an elevated temperature and passes through the recuperating zone (7), entering through a first end (11) and exiting at a second end (9). The recuperating zone (7) is initially at a lower temperature than the reforming zone (1). As the synthesis gas passes through the recuperating zone (7), the synthesis gas is cooled to a temperature approaching the temperature of the zone substantially at the second end (9), which is approximately the same temperature as the regeneration feed introduced during the second step of the cycle via conduit (19) (i.e. at temperatures ranging from about 200° C. to about 1,000° C. and preferably from about 400° C. to about 800° C.). As the synthesis gas is cooled in the recuperating zone (7), a temperature gradient (24) is created and moves across the recuperating zone (7) during this step.

At the point between steps, the temperature gradients have moved substantially across the reforming zone (1) and the recuperating zone (7). The zones are sized so that the gradients move across both in comparable time during the above reforming step. The recuperating zone (7) is now at the high temperature and the reforming zone (1) is at low temperature, except for the temperature gradient that exists near the exits of the respective zones. The temperature of the reforming zone (1) near the inlet end (3) has now been cooled to a temperature that approaches the temperature of the hydrocarbon feed that has been entering via conduit (15) (i.e. at temperatures ranging from about 100° C. to about 800° C., preferably from about 300° to about 700° C.).

In the practice of temperature swing reforming, there are alternative means for determining the end of the reforming step. Toward the end of the reforming step, the temperature at end (5) of the reforming zone is reduced and consequently the reforming performance deteriorates below acceptable conversion efficiencies. Reforming performance, as used herein, refers to the conversion of feed hydrocarbons into synthesis gas components of $H_2$, CO and $CO_2$. The term percent conversion, as used herein, is calculated as the percent conversion of the carbon in feed hydrocarbonaceous species into synthesis gas species of CO and $CO_2$. The term unconverted product hydrocarbons, as used herein, refers to product hydrocarbonaceous species that are not synthesis gas components of $H_2$, CO and $CO_2$. These typically include product methane, as well as feed hydrocarbons and the cracking products of feed hydrocarbons. The reforming step ends when the reforming performance deteriorates to a level that is below acceptable limits. In practice, optimization of the overall reforming and synthesis gas utilization process will dictate a desired, time-averaged level of reforming conversion. That time-averaged level of reforming conversion is typically greater than 80%, preferably greater than 90%, and most preferably greater than 95%.

The point in time at which the reforming step is ended, and thus the duration of the reforming step, may be chosen (a) as a response to the time-varying performance of the reformer during each reforming step; or (b) based on overall (time-averaged) performance or the system; or (c) fixed as a constant reforming step duration or a combination thereof. In embodiment (a), at least one feature of the operation is monitored that is correlated to the reforming performance. This feature may be a composition such as $CH_4$, $H_2$, or CO, or alternatively a temperature, such as the temperature at the end (5) of the reforming bed. In one embodiment of the present invention, the reforming step is ended when the temperature at the end (5) of the reforming has decreased to a pre-selected temperature between about 700° C. and about 1200° C. In embodiment (b), the reforming step duration is adjusted based on a measured feature that reflects the overall (time-averaged) performance or the system. This may be an average product composition such as $CH_4$, $H_2$, or CO. In an alternate embodiment the present invention, the reforming step duration is adjusted based on the time-averaged concentration of $CH_4$ in the product, using control strategies known in the art to shorten or lengthen the duration to achieve a predetermined target $CH_4$ amount. In a preferred alternative of this embodiment, the target $CH_4$ amount is set at an amount that represents between about 1% and about 15% of the hydrocarbonaceous feed carbon. In case (c), the reforming step duration is of fixed length, at a value that is predetermined to be acceptable for the space velocity of the operation. In one embodiment the present invention, the reforming step duration is fixed at a duration between about 0.1 sec and less than about 60 seconds and preferably between about 1.0 and 30 seconds.

After the synthesis gas is collected via an exit conduit (17) at the second end (9) of the recuperating zone (7), the second step of the cycle, also called the regeneration step begins. The regeneration step, illustrated in FIG. 1b, transfers heat from the recuperator bed (7) to the reformer bed (1). In so doing, the temperature gradients 25 and 26 move across the beds similar to but in opposite directions to gradients 23 and 24 during reforming. In a preferred embodiment, an oxygen-containing gas and fuel are introduced via a conduit (19) into the second end (9) of the recuperating zone (7). This mixture flows across the recuperating zone (7) and combusts substantially at the interface (13) of the two zones (1) and (7). The combustion preferably occurs at a region proximate to the interface (13) of the recuperation zone (7) and the reforming zone (1). The term, "region proximate", in the present invention, means the region of the TSR beds in which regeneration step combustion will achieve the following two objectives: (a) the heating of the reforming zone such that end (5) of the reforming zone is at a temperature of at least 800° C., and preferably at least 1000° C. at the end of the regeneration step; and (b) the cooling of the recuperation zone to a sufficient degree that it can perform its function of accepting synthesis gas sensible heat in the subsequent reforming step. Depending on specific regeneration embodiments described herein, the region proximate to the interface can include from 0% to about 50% of the volume of the recuperation zone (7), and can include from 0% to about 50% of the volume of the reforming zone (1). In a preferred embodiment of the present invention, greater than 90% of the regeneration step combustion occurs in a region proximate to the interface, the volume of which region includes less than about 20% the volume of the recuperating zone (7) and less than about 20% the volume of reforming zone (1).

The location of combustion may be fixed by introduction of one of the combustion components, e.g., the fuel, at or substantially at, the interface of the two zones (13), while the other component, e.g., the oxygen-containing gas may be introduced at the first end (9) of the recuperating zone (7). Alternatively, the fuel and oxygen-containing gas (19) streams may be mixed at the open-end (9) of the recuperating zone (7) and travel through the zone and combust at the interface of the zones (13). In this embodiment, the location of combustion is controlled by a combination of temperature, time, fluid dynamics and catalysis. Fuel and oxygen conventionally require a temperature-dependent autoignition time to combust. In one embodiment, the flow of a non-combusting mixture in a first substep of regeneration will set the temperature profile in the recuperating zone (7) such that the zone is not hot enough to ignite until the mixture reaches the interface of the zones.

The presence of catalyst in the reforming zone can also be used to initiate combustion at that location, and a space between the reforming and recuperating zones can be added and designed to further stabilize the combustion process and confine the combustion to the area proximate to the above described interface. In yet another embodiment, the location of combustion is fixed by mechanical design of the recuperating zone. In this design, the fuel and oxygen-containing gas are travelling in separate channels (not shown), which prevent combustion until the feeds combine at the interface of the zones (13). At that location, flame holders (not shown) or a catalyst in the reforming zone may be used to initiate combustion.

The combustion of the fuel and oxygen-containing gas creates a hot fluegas that heats the reforming zone (1) as the flue gas travels across that zone. The fluegas then exits through the first end of the reforming zone (3) via a conduit (27). The composition of the oxygen-containing gas/fuel mixture is adjusted to provide the desired temperature of the reforming zone. The composition and hence temperature is adjusted by means of the proportion of combustible to non-combustible portions of the mixture. For example, non-combustible gases such as $H_2O$, $CO_2$, and $N_2$ can be added to the mixture to reduce combustion temperature. In a preferred embodiment, non-combustible gases are obtained by use of steam, flue gas, or oxygen-depleted air as one component of the mixture. When the hot fluegas reaches the temperature gradient within the reformer, the gradient moves further across the bed. The outlet temperature of the fluegas will be substantially equal to the temperature of the reforming zone (1) near the inlet end (3). At the beginning of the regeneration step, this outlet temperature will be substantially equal to the inlet temperature of the reforming feed of the preceding, reforming, step. As the regeneration step proceeds, this outlet temperature will increase slowly and then rapidly as the temperature gradient reaches end (3), and can be 50-500° C. above the temperature of the reforming feed by the end of the step.

The reforming zone is now, once again, at reforming temperatures suitable for catalytic reforming.

The space velocity of a system is typically expressed on an hourly basis as the standard volumetric gas flow rate of feed divided by the volume of catalyst bed, called gaseous hourly space velocity, or GHSV. Space velocity can also be defined in terms of the hydrocarbon component of feed. As so defined, the GHSV for a methane feed would be the standard hourly volumetric gas flow rate of methane divided by the bed volume. As used herein, the term space velocity, abbreviated as $C_1GHSV$, refers to the space velocity of any hydrocarbon feed placed on a $C_1$ basis. As such, the hydrocarbon feed rate is calculated as a molar rate of carbon feed, and standard volume rate calculated as if carbon is a gaseous species. For example, a gasoline feed having an average carbon number of 7.0 that is flowing at a gaseous flow rate of 1,000 NL/hr into a 1.0 L bed would be said to have a space velocity of 7,000. This definition is based on feed flow during the reforming step and wherein the bed volume includes all catalysts and heat transfer solids in the reforming and recuperating zones.

In temperature swing reforming, the space velocity, $C_1GSHSV$, typically ranges from about 500 to about 150,000, preferably from about 1,000 to about 100,000, and most preferably from about 2,000 to about 50,000.

In a preferred embodiment temperature swing reforming is conducted under bed packing and space velocity conditions that provide adequate heat transfer rates, as characterized by a heat transfer parameter, $\Delta T_{HT}$, of between about 0.1° C. to about 500° C., and more preferably between about 0.5° C. and 40° C. The parameter $\Delta T_{HT}$ is the ratio of the bed-average volumetric heat transfer rate that is needed for reforming, H, to the volumetric heat transfer coefficient of the bed, $h_v$. The volumetric heat transfer rate that is needed for reforming is calculated as the product of the space velocity with the heat of reforming (on heat per $C_1$ volume basis). For example, H=4.9 cal/cc/s=2.2 cal/cc*8000 $hr^{-1}$/3600 s/hr, where 2.2 cal/cc is the heat of reforming of methane per standard volume of methane, and 8000 is the $C_1GHSV$ of methane. When the duration of reform and regeneration steps are comparable, the value of H will be comparable in the two steps. The volumetric heat transfer coefficient of the bed, $h_v$, the determination of which is known in the art, and is typically calculated as the product of a area-based coefficient (e.g. cal/cm²s° C.) and a specific surface area for heat transfer ($a_v$, e.g. cm²/cm³), often referred to as the wetted area of the packing.

TSR is typically conducted at pressures ranging from about zero to about twenty atmospheres. The cyclic operation of TSR results in temporal difference, preferably temporal isolation, between the reforming cycle and the regeneration cycle. This permits operation of the reforming step at pressure different from the regeneration step. In a preferred embodiment, the reforming step is preferred at pressures ranging from about zero to about five atmospheres and the regeneration step is performed at pressure ranging from about zero to about four atmospheres. It is also preferred to perform the reforming step at a higher pressure than the regeneration step with the pressure differential between the two steps preferably less than five atmospheres and more preferably less than one atmosphere.

The bed packing material is selected so that its heat transfer characteristics enable high space velocity. It is known in the art that bed packing can be characterized for heat transfer coefficient (h) and characterized for heat transfer surface area (often referred to as wetted area, $a_v$). Correlations for these parameters, based on gas and solid properties, are well known. The product of these two parameters is the bed's heat transfer coefficient on a bed volume basis:

Volumetric heat transfer coefficient:

$$h_V = \frac{BTU}{(ft^3 \text{ Bed})(°F)(s)} \text{ or } = \frac{kcal}{(L \text{ Bed})(°C)(s)}$$

The heat transfer coefficients are sensitive to a variety of gas properties, including flow rate and composition. Coefficients are typically higher during reforming because the hydrogen in the gas has very high thermal conductivity. Coefficients are typically increased by decreasing the characteristic size of the packing (e.g., hence ⅛" beads will have higher $h_v$ than ½" beads).

Determining the heat of reforming of hydrocarbons is well known, and can be expressed on a basis of units of heat per standard volume of hydrocarbon gas. The heat transfer requirement for this TSR system can be expressed as the product of volumetric heat of reforming with the GHSV of the feed.

Volumetric heat transfer requirements of the system are expressed as:

$$H = \frac{GHSV \cdot \Delta H_{REF}}{3600 \, s/hr} = \frac{BTU}{(ft^3 \text{ Bed})(s)} \text{ or } = \frac{kcal}{(L \text{ Bed})(s)}$$

In this equation, GHSV and $\Delta H_{REF}$ have substantially identical units of feed amount. Thus, if the units of GHSV are as NL/hr of $C_1$ per L bed, then the units of $\Delta H_{REF}$ are heat of reaction per NL of $C_1$.

A heat transfer delta-temperature $\Delta T_{HT}$, is also used herein to characterize the TSR system, as taught herein. $\Delta T_{HT}$ is defined herein as the ratio of volumetric heat transfer requirement to volumetric heat transfer coefficient.

Characteristic heat transfer $\Delta T_{HT} = H/h_v$.

This characteristic $\Delta T_{HT}$ describes the balance between heat transfer supply and demand. As used herein, the $\Delta T_{HT}$ is calculated using heat transfer coefficients based on typical regeneration conditions. The characteristic $\Delta T_{HT}$ is a design parameter for the present invention. Packing or space velocity are chosen to satisfy characteristic $\Delta T_{HT}$ requirements of this invention.

$\Delta T_{HT}$ for the present invention is between about 0.1° C. and about 500° C. More preferably, the characteristic $\Delta T$ is between about 0.5° C. and 40° C. For example, if a packing has a heat transfer coefficient of 10 BTU/ft³s° F., then given a methane heat of reforming of 248 BTU/scf the $C_1GHSV$ achievable at a characteristic $\Delta T_{HT}$ of 40° C., would be ~1.5× $10^4$ $hr^{-1}$. Given bed-packing materials that are presently known in the art, including particulate packing, and foam and honeycomb monoliths, the present invention can be operated at high efficiency at a space velocity up to about 100,000 $hr^{-1}$.

In a preferred embodiment the bed packing material will have several characteristics. It will have the ability to cycle repeatedly between high (e.g. $\geq 1000°$ C.) and low (e.g. $\leq 600°$ C.) temperatures, provide high wetted area (e.g. $\geq 6$ cm$^{-1}$) and volumetric heat transfer coefficient (e.g. $\geq 0.02$ cal/cm$^3$s° C., preferably $\geq 0.05$ cal/cm$^{3\cdot °}$ C., and most preferably $\geq 0.10$ cal/cm$^3$s° C.), have low resistance to flow (i.e., low pressure-drop), have operating temperature consistent with the highest temperatures encountered during regeneration, and have high resistance to thermal shock. Furthermore, it is preferred that the material has high bulk heat capacity (e.g. $\geq 0.10$ cal/cm$^{3\cdot °}$ C. and preferably $\geq 0.20$ cal/cm$^{3\cdot °}$ C.). Additionally, the bed packing material will provide sufficient support for the reforming catalyst in the reforming bed. These requirements are met via control of the shape, size, and composition of the bed packing materials.

The shape and size of the bed packing material impact the beds heat transfer capability and flow resistance. This is because packing shape and size impact how the fluid flows through the packing, including, the size and turbulence in the fluid boundary layers that are the primary resistance to heat, mass and momentum transfer between fluid and solid. Furthermore, the size of the materials also impacts thermal shock resistance of the bed, because larger structures are typically susceptible to thermal shock. The shape impacts bed heat capacity through its relationship on bed void volume. The design of advantageous packing shapes to achieve these aspects of the invention is known in the art.

Examples of suitable packing materials include honeycomb monoliths and wall-flow monoliths, which have straight channels to minimize pressure drop and enable greater reactor length. Preferred honeycomb monoliths for the present invention will have channel densities that range from about 100 channels/in$^2$ to about 3200 channels/in$^2$ (15-500 channels/cm$^2$). In an alternate embodiment more tortuous packing, such as foam monoliths and packed beds may be employed. Preferred foam monoliths for the present invention will have pore densities that range from about 10 ppi (pores per inch) to about 100 ppi (i.e. 4-40 pore/cm). Preferred packed beds for the present invention will have packing with wetted surface area that range from about 180 ft$^{-1}$ to about 3000 ft$^{-1}$ (i.e. 6-100 cm$^{-1}$).

The composition of the bed packing material is selected for operating temperature and thermal shock resistance. Thermal shock resistance is generally greatest for materials having low coefficients of thermal expansion, because it is the temperature-induced change in size that stresses a component when temperatures are changing due to cycling. Ceramic materials that are resistant to combustion temperatures and thermal shock are preferred. Cordierite materials (magnesium aluminum silicates) are preferred for their very low coefficients of thermal expansion. Additional preferred materials of construction include aluminum silicate clays, such as kaolin, aluminum silicate clay mixed with alumina, or aluminum silicate clay and alumina mixed with silica and optionally zeolites. Other suitable materials of construction include mullite, alumina, silica-alumina, zirconia, and generally any inorganic oxide materials or other materials stable to at least 1000° C. The materials may be used alone or in combination, and may have their structures stabilized, for example by use of rare earth additives. The bed packing materials of the regenerating zone can either be the same or different from the packing materials of the reforming zone.

The configuration of the beds within the reforming and recuperating zones may take the many forms that are known in the art. Acceptable configurations include horizontal beds, vertical beds, radial beds, and co-annular beds. Packing may be monolithic or particulate in design. Particulate packing may become fluidized during some steps of the present invention. In a preferred embodiment, bed packing is maintained in a fixed arrangement.

Suitable reforming catalysts include noble, transition, and Group VIII components, as well as Ag, Ce, Cu, La, Mo, Mg, Sn, Ti, Y, and Zn, or combinations thereof, as well as other metal and non-metal materials added to stabilize and/or enhance catalytic performance. As used herein above, the term component relates to a metal or metal oxide thereof. Preferred catalyst systems include Ni, NiO, Rh, Pt, and combinations thereof. These materials may be deposited or coated on, or in, catalyst supports well known in the art.

Figure 2:
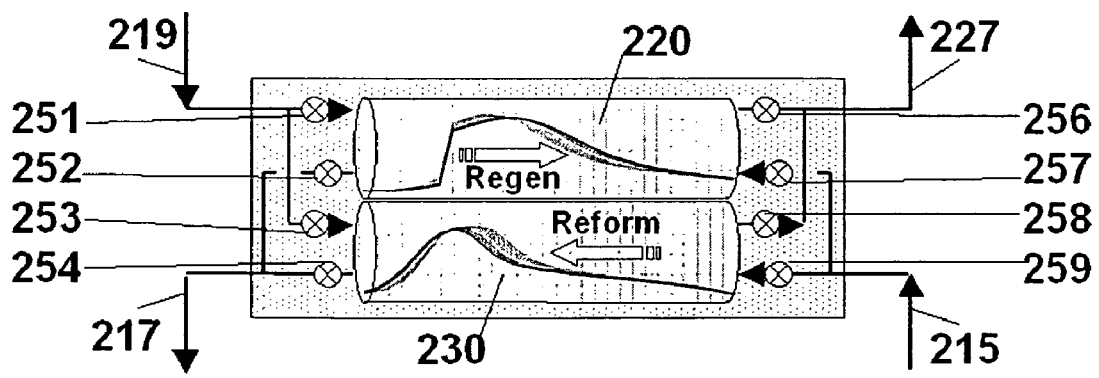
FIG. 2 is a diagrammatic illustration of temperature swing reforming using a dual bed, valved system.

FIG. 2 illustrates an embodiment of the temperature swing reforming diagrammatically illustrating the cyclic reforming and regeneration process. In this embodiment, two temperature swing reforming bed systems are used simultaneously such that one system is reforming while the other is regenerating. The use of multiple beds can provide a substantially continuous flow of reformed product notwithstanding the cyclical operation of each bed. In FIG. 2, a first bed (220) is engaged in the step of regeneration, while a second bed (230) is engaged in the step of reforming. Each bed (220 and 230) includes both reforming and recuperating zones. In this embodiment, several sets of valves are used to control the various streams flowing to and from the beds. A first set of valves (257 and 259) controls the flow of hydrocarbon feed and steam feed to the beds, while a second set of valves (252 and 254) control the flow of the product of the reforming step exiting the recuperating zones. The third set of valves (251 and 253) regulate the flow of oxygen-containing gas/fuel and optional non-combusting gas to the beds and the fourth set of valves (256 and 258) control the flow of fluegas exiting the reforming zone.

In operation, when valves (251), (254), (256), and (259) are open, valves (252), (253), (257) and (258) are closed. With these valve states, oxygen containing gas and fuel (219) enter the bed (220) through valve (251) while fluegas (227) exits the bed (220) through valve (256). Concurrently, the hydrocarbon and steam feed (215) enters the second bed (230) through valve (259) while the product of reforming (217) exits this bed (230) through valve (254). At the conclusion of this step, valves (252), (253), (257) and (259) now open and valves (251), (254), (256) and (257) now close, and the cycle reverses, with the first bed (220) reforming the feed and the second bed (230) regenerating the heat.

Figure 3:
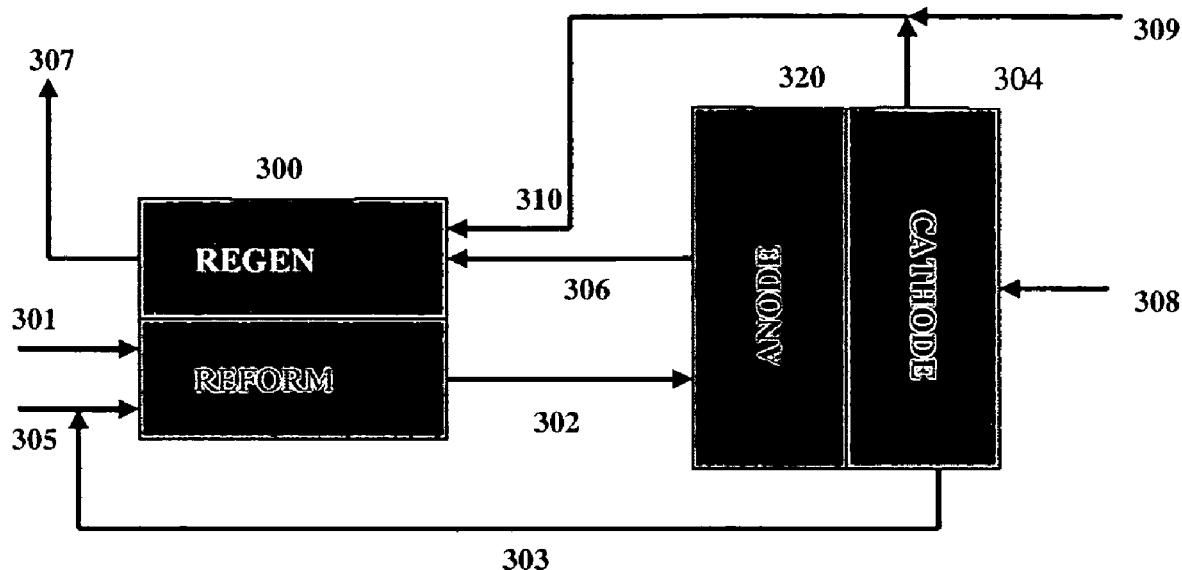
FIG. 3 is a diagrammatic illustration of a process design using temperature swing reforming for a proton conducting solid oxide fuel cell application.

FIG. 3 diagrammatically illustrates the temperature swing reforming process described above to supply hydrogen fuel to a proton conducting solid oxide fuel cell. The TSR unit (300) may include a single bed or preferably, multiple beds. In the optional embodiment of multiple beds the valving and flow controls are contained within the unit (300) and not illustrated in this Figure. Their form and function are as described above in reference to FIG. 2. Referring to FIG. 3, a hydrocarbon containing feed (301) such as gasoline, and steam (305) are supplied to the reforming zone of the TSR reactor (300). The hydrocarbon containing feed gases and steam are converted to a synthesis gas using the temperature swing reforming process previously described. The synthesis gas (302) generally comprises CO, $CO_2$, $H_2$, $H_2O$ and residual hydrocarbon gases. The temperatures of the syngas produced by TSR ranges from about 200° C. to about 1000° C., and preferably from about 400° C. to about 800° C. The outlet pressure of syngas produced by TSR ranges from about zero (0) atmospheres gauge to about twenty-five (25) atmospheres, and preferably from about zero (0) atmospheres to about five (5) atmospheres gauge pressure.

The hydrogen containing syngas (302) is fed to the fuel cell anode. In a preferred embodiment the SOFC operates at elevated temperatures, and in particular the anode region of the cell, typically from about 400° C. to about 1000° C., preferably from about 500° C. and about 800° C. In a preferred embodiment, the syngas (302) undergoes further reforming, with a water-gas shift of CO at the anode region to further increase the hydrogen content of the fuel. The hydrogen enriched syngas is supplied to the fuel cell anode where its hydrogen content serves as the source of protons for the electrochemical reaction to generate electricity in the SOFC. The term hydrogen enriched means a syngas having additional hydrogen content, which in this embodiment is produced by the additional shift of steam and CO to $CO_2$ and $H_2$ that occurs in the anode region of the SOFC. Oxygen containing gas (308), typically supplied as air, is fed to the cathode of the SOFC. SOFC protons are transported across the dense electrolyte to combine with electrons and oxygen at the cathode. The electrons reach the cathode after moving through the external electrical load. The effluent (306) from the anode comprises CO, $CO_2$, $CH_4$ and residual hydrocarbons, along with any residual hydrogen not consumed by the fuel cell. In a preferred embodiment, the residual fuel content of this effluent stream is used to fuel (in whole or in part) the regeneration process of TSR described hereinabove. In an alternative embodiment, fuel used to fuel (in whole or in part) the TSR regeneration process comprises a portion of the syngas otherwise fed to the fuel cell anode (not shown).

Oxidant (310) for TSR regeneration may be supplied by alternative means. In one embodiment, oxygen containing gas (309), typically supplied as air, is used. Alternatively, oxygen gas source (309) may comprise a diluent gas, such as re-cycle exhaust from an internal combustion engine, for example. In an alternate embodiment, a portion of the cathode effluent air (304) is utilized for the TSR regeneration process, the air introduced into the cathode (308) being sufficient to supply the oxygen requirement of the SOFC cathode, and serve as the oxidant in the regeneration cycle for TSR as described above. In a preferred embodiment, cathode stoichiometry is between about 1.0 and 1.5 (i.e. about 0% to about 50% excess oxygen supplied at the cathode), and more preferably between about 1.0 and 1.3. Cathode stoichiometry is the ratio of the oxygen supplied to the cathode, to the oxygen consumed in the cathode (i.e, by reaction with the protons). Oxidant (310) for TSR regeneration may comprise cathode exhaust (304), oxygen containing gas (309) or a combination thereof.

Though illustrated as physically separated, in a preferred embodiment TSR (300) and the SOFC (320) comprise a physically integrated apparatus. Advantages of the integrated apparatus include improved heat integration, reduction or elimination of liquid water collection and storage means, and rapid initial heat up of the SOFC to suitable operating temperature. In a physically integrated system, the inputs and outputs from the TSR reactor and the SOFC are directly coupled with the use of no processes other than heat exchange among these streams. The oxygen source for the TSR is delivered, in part, by a fraction of the cathode exhaust gas (stream 304). The remaining cathode effluent (303) is used directly as the source of steam for the reformer. The TSR reforming effluent (302) is used directly, without further processing, by the SOFC anode. Anode effluent (306) serves as a source of fuel for the TSR regeneration step. Intermediate processes other than optionally heat exchange are not required when the two processes are so integrated. This avoids the complexity of other processes such as water condensation, water-gas shift, hydrogen separation, or carbon monoxide removal. The physical integration of the processes results in the units placed within the same thermally insulated system, minimizing the size of auxiliary pipes, insulation and other components. In this embodiment, the TSR processes are run at about the same pressure as the SOFC.

Example 1

An integrated TSR, proton conducting solid oxide fuel cell system, fueled by a hydrocarbon containing fuel, is operated with the following characteristics:
Bed packing material=1200 cpsi honeycomb monolith
Six second cycle
Average $C_1$ GHSV=5,000
Reforming pressure=1.5 atm
Regeneration pressure=1.0 atm
Reformer steam to carbon (S/C) ratio about 1.5:1.0
Cathode stoichiometry about 1.1

TABLE 1

| | Molar Flow Rates: | | | | | | |
|---|---|---|---|---|---|---|---|
| species | Reform Feed | Reform Product | Hydrogen Consumed in Anode | Anode Effluent | Cathode Effluent | Combined Regen Feed | Regen Fluegas |
| Temp. C. | 500 | 538 | | 500 | 500 | 500 | 490 |
| Pres. Atm | 1.50 | 1.5 | 1 | 1.3 | 1.5 | 1.1 | 1 |
| CH4 | 5.15 | 0.15 | 0 | 0.15 | | 0.15 | 0.01 |
| H20 | 7.75 | 2.79 | 0 | 0.85 | 16.40 | 6.51 | 7.33 |
| H2 | 0 | 14.97 | 16.31 | 0.59 | | 0.59 | 0.04 |
| CO | 0 | 4.23 | 0 | 2.30 | | 2.30 | 0 |
| C02 | 0 | 0.74 | 0 | 2.67 | | 2.67 | 5.13 |
| N2 | 15.98 | 15.98 | 0 | 15.98 | 33.93 | 33.17 | 33.19 |
| O2 | 0.39 | 0 | 0 | 0 | 0.82 | 1.74 | 0.01 |
| | 29.27 | 38.86 | 16.40 | 22.45 | 51.15 | 46.89 | 45.58 |
| ΔHc rate | 985 | 1178 | 943 | 219 | | 219 | |

In the example, the cathode effluent is divided between uses as reformer feed and as regeneration diluent. Higher steam to carbon ("S/C") ratios can be achieved by directing a larger fraction of the cathode effluent to the reformer feed. This will increase the diluent level in the reforming step, as well as in the syngas product and anode purge material that is sent to the TSR regeneration step.

Figure 4:
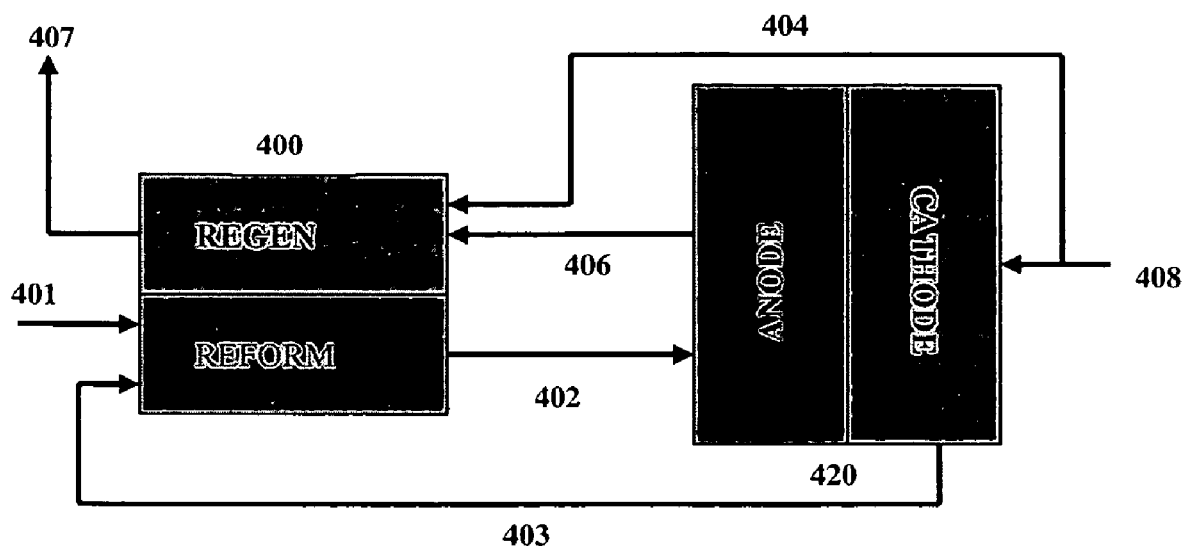
FIG. 4 is a diagrammatic illustration of an alternative process design using temperature swing reforming for a proton conducting solid oxide fuel cell application.

By directing substantially all the cathode effluent to the reforming inlet, as shown in FIG. 4, TSR can be performed at higher steam to carbon (S/C) ratios.

Referring to the Figure in this embodiment, substantially all of the steam-containing cathode effluent (403) is recycled to the reformer and the oxygen containing stream (404) entering the regeneration cycle is typically air (408) that is also supplied to the cathode of the SOFC (420). Fuel for the process is provided as liquid or gaseous hydrocarbons (401). The effluent from the PSR (400) reactor is syngas (402) along with potential diluents carried in the cathode exhaust (403). Unused fuel from the anode (406) is used as the regeneration fuel for the PSR process.

Though not illustrated in the figures, an optional condenser and storage tank may be placed in the exhaust stream (307) and (407) to capture water vapor from the regenerator effluent. This recovered water may be used to supplement reforming steam requirements, particularly useful during transient operation. Recovered water may also be injected into streams 403, 406, 303 or 306 to reduce TSR reactor inlet temperature to facilitate overall process temperature control.

What is claimed is:

1. A method for producing electrical energy from a proton conducting solid oxide fuel cell having an anode and cathode, said method comprising:
   (a) reforming a hydrocarbon containing feed with steam in a cyclic reforming and regeneration process comprising:
      i. introducing the feed and steam through a first zone of a reactor containing bed packing material and a reforming catalyst at a space velocity of at least 500 $hr^{-1}$ under reforming conditions,
      ii. passing at least a portion of the product of step i through a second zone of the reactor containing bed packing material and transferring heat from the product to the packing material,
      iii. removing substantially all the product from the second zone said product comprising a syngas enriched in hydrogen,
      iv. introducing an oxygen containing gas into the second zone and combusting the gas and a fuel in a region proximate to an interface between the first and second zone to produce heat and a combustion product and transferring heat of the combusting to the bed packing material of the first zone,
      v. removing substantially all of the combustion product from the first
   (b) supplying said reform product from step iii to an anode region a proton-conducting solid oxide fuel cell and an oxidant to a cathode region of said fuel cell to produce electricity wherein the air supplied to the cathode has an oxygen stoichiometry that ranges from about 1.0 to about 1.5; and
   (c) controllably supplying at least a portion of effluent from the fuel cell cathode directly to step i of the reforming process to supply steam thereto, the remaining portion of the cathode effluent supplied directly to step iv. of the regeneration process as a regeneration diluent, whereby increasing the portion of cathode effluent supplied to the reforming process increases reforming steam to carbon ratios.

2. The method of claim 1 wherein the proton conducting solid oxide fuel cell is operated at a temperature ranging from about 400° C. to about 1000° C.

3. The method claim 2 wherein the temperature ranges from about 400° C. to about 800° C.

4. The method of claim 1 wherein said cathode oxygen stoichiometry ranges from about 1.0 to about 1.3.

5. The method of claim 1 wherein reformer steam comprises water condensate from regeneration effluent.

6. The method of claim 1 wherein reforming and regeneration cycles conducted at pressures whose differential is less than about 15 atmospheres.

7. The method of claim 6 wherein the pressure differential is less than about 5 atmospheres.

8. The method of claim 7 wherein the pressure differential is less than about 2 atmospheres.

9. The method of claim 1 wherein anode pressure of the solid oxide fuel cell is substantially the same as reformer pressure, and cathode pressure is substantially the same as regeneration pressure.

10. The method of claim 1 wherein the cyclic reforming process and the solid oxide fuel cell are commonly contained.

11. The method of claim 1, wherein the cyclic process has a characteristic $\Delta T_{HT}$ ranging from about 0.1° C. to about 500° C.

12. The method of claim 11 wherein $\Delta T_{HT}$ ranges from about 0.5° C. to about 40° C.

13. The method of claim 1 wherein the space velocity ranges from about 1,000 to about 100,000 $hr^{-1}$.

14. The method of claim 13 wherein the space velocity ranges from about 2,000 to about 50,000 $hr^{-1}$.

15. The method of claim 14 wherein the reactor bed packing material has a volumetric heat transfer coefficient of greater than about 0.05 $cal/cm^3 s°$ C.

16. The method of claim 1 or 15 wherein the packing material is a honeycomb monolith having channel densities ranging from about 15 $channels/cm^2$ to about 500 $channels/cm^2$.

17. The method of claim 1, wherein the packing materials of said first zone or said second zone or both are composed of a material selected from stabilized or unstabilized magnesium aluminum silicates, aluminum silicate clays, mullite, alumina, silica-alumina, zirconia, and mixtures thereof.

18. The method of claim 1, wherein the catalyst is selected from the group consisting of noble metal components, Group VIII metal components, Ag, Ce, Cu, La, Mo, Mg, Sn, Ti, Y, and Zn.

19. The method of claim 1, wherein the hydrocarbon containing feed with steam has an inlet temperature ranging from about 100° C. to about 800° C.

20. The method of claim 19, wherein the hydrocarbon containing feed with steam has an inlet temperature ranging from about 300° C. to about 700° C.

21. The method of claim 1, wherein the reforming conditions comprises a reforming bed having at least a portion thereof heated to a temperature of about 800° C. to about 1600° C.

22. The method of claim 1 wherein step b is further characterized as supplying a reform product comprising hydrogen, CO, $CO_2$, hydrocarbons, and steam to the fuel cell anode at a temperature of greater than about 200° C. whereby the reform product is further water-gas shifted to supply a hydrogen enriched syngas to the anode of the fuel cell.

23. The method of claim 1 wherein the fuel of step iv of the process is supplied by at least a portion of the syngas of step iii of the process.

24. The method of claim 1, including: measuring the temperature at or substantially at the interface between said first and second zones and, upon reaching a pre-determined first temperature, the oxygen-containing gas is introduced to said second zone; and measuring the temperature at about the first end of said first zone and, upon reaching a pre-determined second temperature, the hydrocarbon, containing feed and steam feed is introduced to said first end of said first zone.

25. The method of claim 1, including: measuring the temperature at about the interface between said first and second zones and, upon reaching a pre-determined temperature, the regeneration step (iv) is begun, and measuring the temperature at about the first end of said first zone and, upon reaching a pre-determined second temperature, the reforming and recovery steps (i), (ii), and (iii) are begun.

26. The method of claim 1 wherein two or more reactors are operated simultaneously, such that steps i, ii, and iii are in progress on at least one reactor while steps iv, and v are in progress on at least one other reactor providing a substantially uninterrupted stream of reform product to the fuel cell.

27. The method of claim 1 wherein substantially all the cathode effluent is supplied to step i., comprising steam for reforming.

* * * * *